United States Patent [19]

Bigelow et al.

[11] Patent Number: 5,430,580
[45] Date of Patent: Jul. 4, 1995

[54] PNEUMATIC EDGE CLAMP AND MAGNETIC BIAS ARRAY FOR ANHYSTERETIC RECORDING

[75] Inventors: Donald O. Bigelow, Webster; Thomas W. Palone, Rochester, both of N.Y.

[73] Assignee: Eastman Kodak Company, Rochester, N.Y.

[21] Appl. No.: 108,037

[22] Filed: Aug. 17, 1993

[51] Int. Cl.⁶ .................................................. G11B 5/86
[52] U.S. Cl. ........................................................ 360/17
[58] Field of Search .......................... 360/17, 16, 15, 2; 226/97

[56] References Cited

U.S. PATENT DOCUMENTS

| | | | |
|---|---|---|---|
| 3,472,971 | 10/1969 | Van den Berg | 179/100.2 |
| 3,519,760 | 7/1970 | Hatley | 179/100.2 |
| 3,536,855 | 10/1970 | Gardner, Jr. et al. | 179/100.2 |
| 3,544,732 | 12/1970 | Bauer et al. | 179/100.2 |
| 3,650,043 | 3/1972 | Overly et al. | 226/97 X |
| 3,703,612 | 11/1972 | Higashida et al. | 179/100.2 |
| 3,813,688 | 5/1974 | Dolby et al. | 360/17.274 |
| 3,824,617 | 7/1974 | Kobayashi et al. | 360/16 |
| 3,825,948 | 7/1974 | Hendershot, III et al. | 360/16.36 |
| 4,110,797 | 8/1978 | Hoshino et al. | 360/17 |
| 4,213,159 | 7/1980 | King | 360/16 |
| 4,302,523 | 11/1981 | Audran et al. | 360/2 X |
| 4,698,700 | 10/1987 | Shirai | 360/16 |
| 4,752,842 | 6/1988 | Odagiri | 360/74.1 |
| 4,814,899 | 3/1989 | Gantzhorn, Jr. et al. | 360/16 |
| 4,882,636 | 11/1989 | Billings et al. | 360/16 |
| 4,893,208 | 1/1990 | McClure | 360/118 |
| 5,179,475 | 1/1993 | McClure | 360/17 |

FOREIGN PATENT DOCUMENTS

| | | |
|---|---|---|
| 138117 | 6/1948 | Australia . |
| 2262037 | 6/1974 | Germany . |
| 55-119649 | 9/1980 | Japan . |
| 0088921 | 4/1989 | Japan . |
| 7211934 | 9/1972 | Niger . |

OTHER PUBLICATIONS

IBM Technical Disclosure Bulletin #1711 vol. 10 #11, Apr. 1968.

Primary Examiner—Andrew L. Sniezek
Attorney, Agent, or Firm—Charles E. Snee, III

[57] ABSTRACT

Apparatus for pneumatically clamping and magnetically biasing magnetic media during anhysteretic transfer comprises a housing (64, 74, 76, 80, 82, 88, 90, 96, 98) which encloses a pair of pneumatic plenums (112) connected to a source of high pressure air (70, 72, 73) and a pair of arrays (106) of biasing magnets (108); so that, air from the plenums flows between the magnets and bands (57) at the edges of the media to provide intimate contact of the media during anhysteretic transfer.

12 Claims, 5 Drawing Sheets

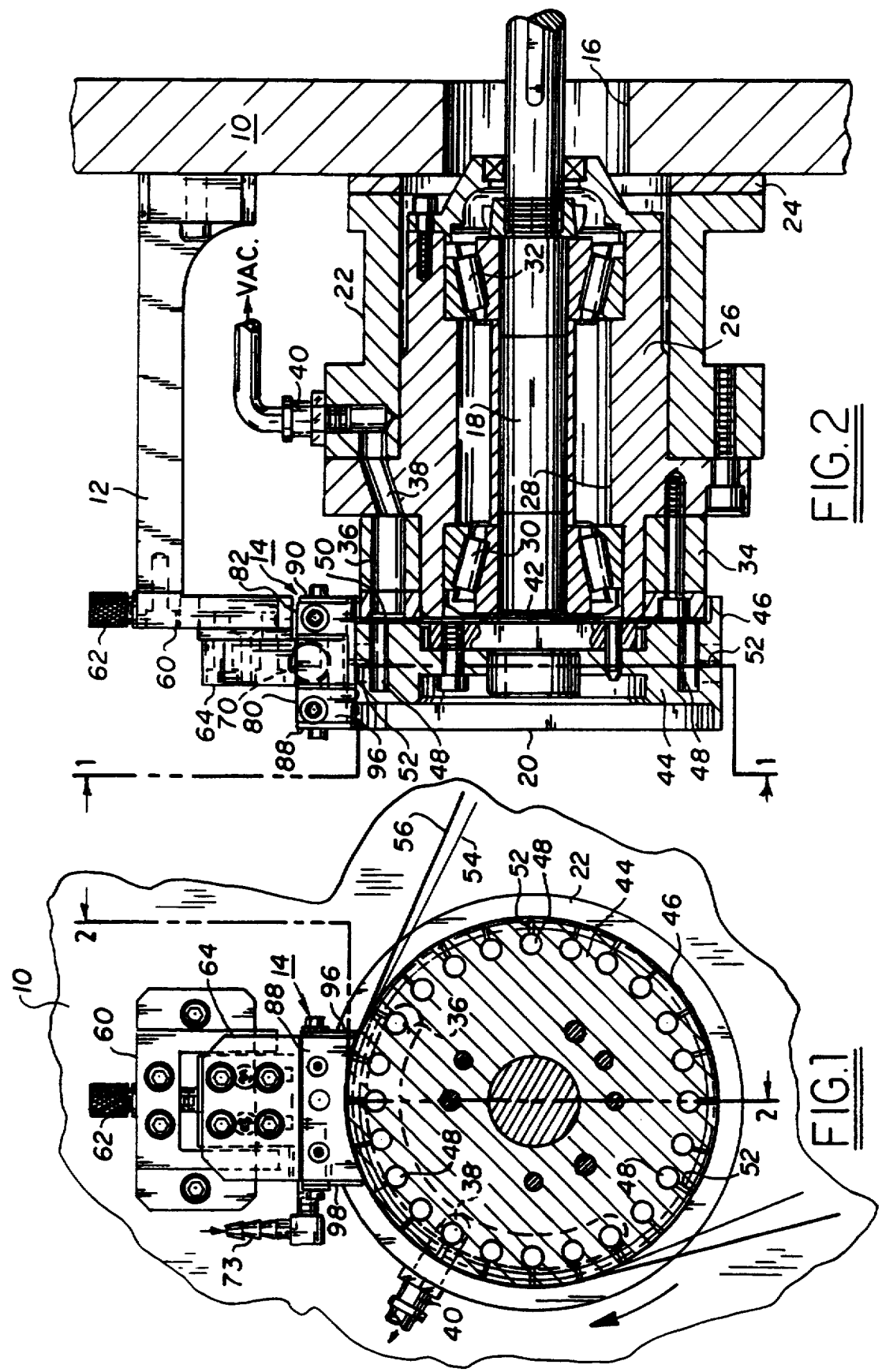

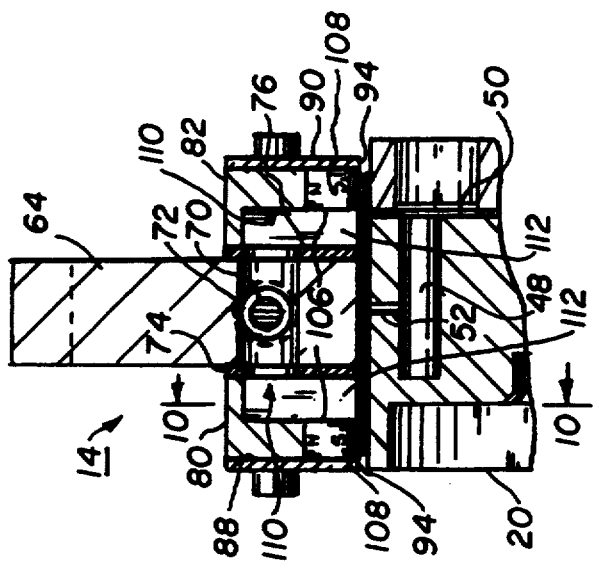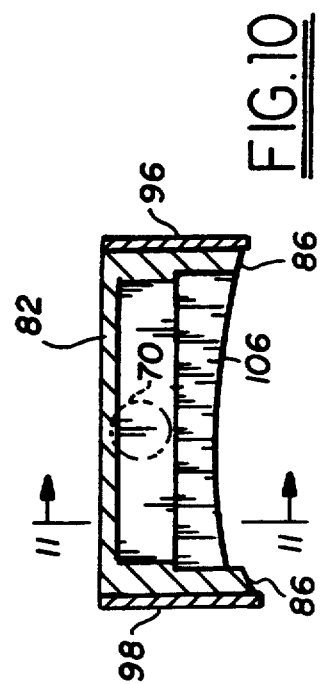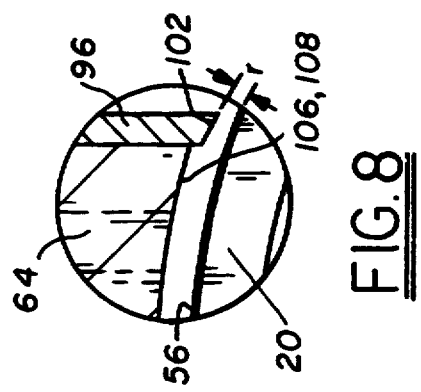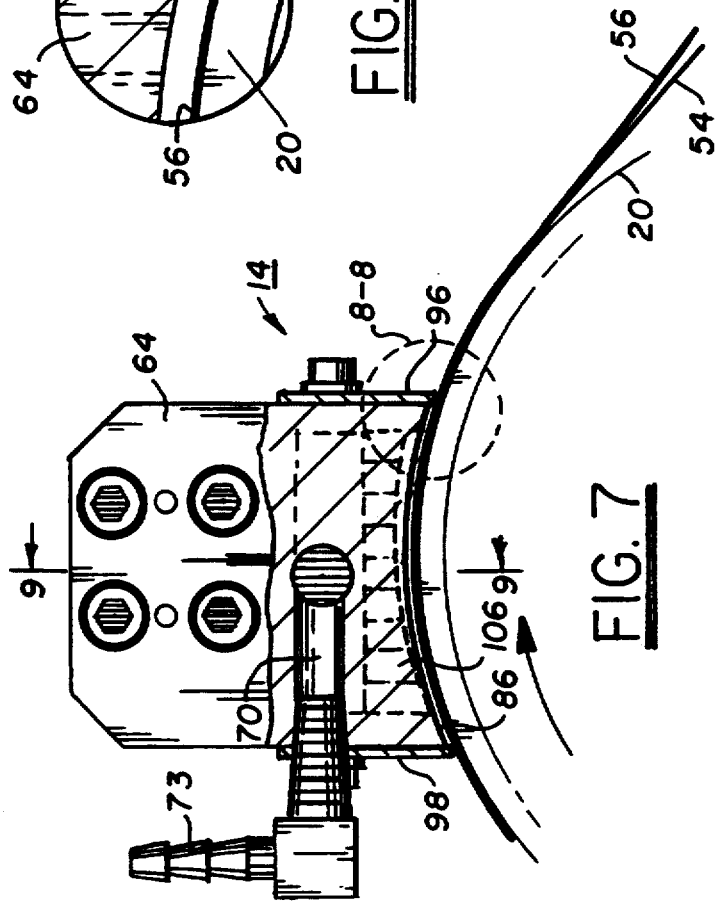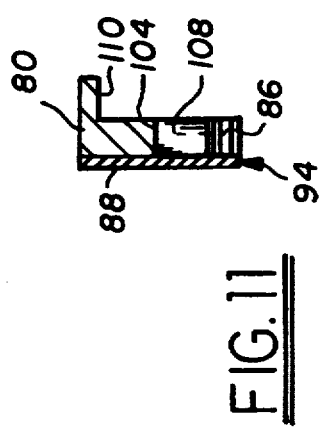

PNEUMATIC EDGE CLAMP AND MAGNETIC BIAS ARRAY FOR ANHYSTERETIC RECORDING

DESCRIPTION

1. Technical Field

The invention concerns pneumatic clamps and magnetic bias arrays useful for bringing a master magnetic recording medium into intimate contact with a slave magnetic recording medium and for magnetically biasing the contacting media to cause anhysteretic transfer of information from the master to the slave. More particularly, the invention concerns a combined pneumatic clamp and magnetic bias array useful for anhysteretically recording onto bands along the edges of an elongated web of photographic film including a magnetic recording medium; so that, information may be transferred from a master magnetic medium onto the film in areas outside those intended for photographic images.

2. Background Art

Conventional magnetic recording requires a stationary recording head which makes contact with a moving surface of a magnetic medium, which may be in web, disk or drum form. Because of the tendency of such heads to abrade the magnetic medium, at least the surface layer of the magnetic medium generally is made from a durable material selected to resist abrasion. In recent years, photographic films have been developed which include on one side of a base material, various layers of photosensitive materials; and on the other side, a thin, virtually transparent layer of magnetic medium. The magnetic medium can be used, for example, during manufacture of the film to record information related to the film's characteristics; during use of the film in the camera to enable the camera to read and adjust itself in response to previously recorded information and/or to record information about camera settings and scene characteristics; and during processing or developing of the film to enable the processing equipment to read previously recorded information and adjust the processing parameters accordingly. However, because of the presence of the magnetic medium in a photographic film, the properties of the surface layer of the magnetic medium are chosen more for their photographic suitabilities than for their resistance to the sort of abrasion which can occur due to contact with a stationary recording head in a conventional recording process. Any abrasion on the film surface must be avoided since it would degrade the optical properties of the film and thereby prevent capture and reproduction of high quality images. As a result, if conventional recording apparatus were used to record to the magnetic recording medium on such a film, there would be a danger that the portion of the film containing the magnetic medium would be damaged due to abrasion. Use of a contact head is acceptable in a camera due to the low speed of recording and reading, but would not be acceptable in a high speed film manufacturing process. Moreover, even if a small amount of abrasion were acceptable in a manufacturing process, the abraded material would tend to build up on the recording head, thereby increasing the gap between the head and the recording medium and potentially degrading the signal applied to the recording medium to an unacceptable level. Also, such abraded material would tend to break loose from the head, resulting in loose dirt on the film which would degrade performance.

Another type of recording process, known as anhysteretic recording, has been used for many years for duplication of magnetic media, particularly video and audio tapes, without requiring the use of a recording head which may abrade the media. In this process, a master magnetic medium is prepared which typically has a magnetic coercivity about two to three times higher than the coercivity of the slave medium on which duplicate copies are to be made. The master medium may be provided in web or drum format and is prerecorded with the information to be duplicated. The master medium and the slave medium are then brought into intimate, stable contact, with no relative motion, in the presence of a decaying, alternating magnetic bias field; so that, a mirror image of the information on the master is transferred to the slave. The necessary bias field has been provided in some applications by inductive magnetic heads driven by alternating current, which tend to be sensitive to positioning relative to the media and also are dependent on the speed of movement of the media past the head. Typically, a minimum of ten flux reversals is considered necessary to ensure proper switching for each magnetic particle. Alternatively, as shown in commonly assigned U.S. Pat. No. 5,179,475, arrays of small, alternatingly polarized permanent ceramic magnets have been suggested for use, which can provide the necessary decaying field with an appropriate number of flux reversals but are not speed sensitive. Such ceramic magnets, however, provide flux fields with steep gradients which tend to make reliable use quite dependent on very precise positioning of the biasing magnets relative to the magnetic media.

Since there is no abrasion between the master and slave media in conventional apparatus and processes useful for anhysteretic recording, the application of such apparatus and processes to record to photographic film having a magnetic medium would appear promising. However, recording to a photographic film introduces a number of problems not found in conventional duplicating of video and audio tapes. For example, applications for still camera photography will require recording of digital signals of relatively low bit density due to the characteristics of the magnetic medium on the film, likely no higher than 1000 bits per inch (39.4 bits per millimeter) which means that recording onto the film must be done with a very high degree of reliability since redundant recording will not be feasible. Much higher bit densities typically are used for data, video and audio applications, such as 10,000 bits per inch (394 bits per millimeter) for digital tape, 6,000 bits per inch (236 bits per millimeter) for floppy disks and 10,000 bits per inch (394 bits per millimeter) for Winchester disks. So that conventional, contact head equipment for reading the signals recorded to the photographic film will not damage the central image area of the film, it is desired to record only onto bands along the very edges of the film, rather than in the central portion of the magnetic medium as would be the case for non-photographic applications. Because the well known anticlastic effect will cause the bands along the edges of the photographic film slave medium to curl away slightly from an underlying master medium in drum format, intimate contact may be reduced in the very area where recording is desired. The anticlastic effect is more pronounced with a photographic film than with a conventional magnetic tape for given levels of tension and elastic modulus, since the photographic film is several times thicker than such tape. Moreover, air tends to become entrained between the slave and master media during recording at manufacturing web transport speeds, which causes loss of intimate contact and prevents good signal transfer from the master medium to the slave medium, particularly at higher velocities and with wider webs.

Pinch rollers have been used to squeeze air from between the media; but with a pressure sensitive photographic film, such rollers are undesirable since they may cause images on the exposed film to exhibit unsightly pressure marks. Various types of air clamping devices are also known which apply elevated pressure air to conventional tape media to force air from the interface and bring the media into the desired intimate contact. However, such devices are designed to produce intimate contact between the central portions of such tape media where recording is to occur, rather than between bands along the edges of the media as would be required for recording to the edges of photographic film comprising a magnetic medium.

Thus, a need has existed for improvements to conventional apparatus for anhysteretic recording to suit them for recording to bands along the edges of webs of photographic films bearing magnetic media. More particularly, a need has existed for anhysteretic recording apparatus which can record along bands at the edges of a photographic film, with low signal density and low loss of signal; which can efficiently remove air from the interface between the media being recorded at high speeds without risking pressure marking of or other damage to the film; and which can bring the bands along the edges of a photographic film into intimate contact with a master recording medium. A need has also existed for such an apparatus whose performance during anhysteretic recording is substantially less sensitive to variations in the position of the magnetic array relative to the magnetic media.

SUMMARY OF THE INVENTION

The primary objective of this invention is to provide an improved, combined pneumatic edge clamp and magnetic bias array for use in anhysteretically recording from a master magnetic medium to bands along the edges of a web of photographic film including a slave magnetic medium.

Other desirable objectives and advantages inherently achieved by the disclosed invention may occur or become apparent to those skilled in the art. Nonetheless, the scope of the invention is to be limited only by the appended claims.

The invention is defined by the appended claims. The apparatus of the invention is particularly suited for pneumatically clamping a portion of at least one edge of an elongated web of photographic film into intimate contact with a master magnetic recording medium. The film includes a slave magnetic recording medium and has a centerline. The apparatus also is suited for magnetically biasing the contacting media to cause anhysteretic transfer of information from the master medium to a band along the edge of the film as the band moves past the apparatus while in intimate contact with the master medium. A housing is provided which comprises a pneumatic engagement surface and the housing is mounted with the engagement surface closely facing a zone of the intimate contact between the film and the master recording medium. The master medium may be provided in the form of a magnetic layer coated onto a drum or web of magnetic tape wrapped partially around a drum. A pneumatic plenum is included within the housing, the plenum being opened through the engagement surface to face the film between the centerline and the band along the edge of the film, the plenum further being elongated in a direction parallel to the edge of the film. A separate plenum may be provided for clamping each edge of the film or a single plenum may be provided for both edges. Means are provided for directing a flow of gas into the pneumatic plenum and, thus, into contact with the media to force them into intimate contact, thereby expelling air from between the media. An array of alternatingly polarized permanent magnets situated in side by side relationship is provided next to the plenum, each magnet of the array having a pole face with a width extending substantially across the band along the edge of the film, each pole face facing the band in the zone of intimate contact. The array is supported by the housing and is elongated in a direction essentially parallel to the edge of the film. As a result of this unique combination of features, gas flowing from the plenum will pass between the pole faces and the band along the edge of the film in the zone of intimate contact to clamp the band into intimate contact with the master medium, thereby enabling alternating magnetic fields from the array to cause the anhysteretic transfer of information from the master medium to the band along the edge of the film.

In one embodiment of the invention, the housing comprises a side surface; the array is positioned between the plenum and the side surface; and the side surface terminates at an edge extending beyond the engagement surface and facing the band along the edge of the film. The side surface may be comprised in a side plate including the edge facing the band and means may be provided for permitting movement of the side plate relative to the housing toward or away from the band along the edge of the film, thereby to control the flow area for the gas. The housing may also comprise front and back plates extended transverse to the edge of the film, the front and back plates each having an edge extending beyond the engagement surface and facing the film; and means may be provided for permitting movement of the front and back plates toward or away from the film, thereby to control the flow area for the gas. To permit adjustment of the clearance between the apparatus and the media, means may be provided for moving the housing toward or away from the zone of intimate contact. The means for moving may be centered on the array.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIG. 1 shows a fragmentary, partially sectional elevation view of an anhysteretic recording apparatus embodying the apparatus of the invention, taken along line 1—1 of FIG. 2.

FIG. 2 shows a partially sectional elevation view taken along line 2—2 of FIG. 1.

FIG. 7 shows an enlarged, partially sectional elevation view of the apparatus of the invention.

FIG. 8 shows an enlarged view of detail 8—8 of FIG. 7.

FIG. 9 shows a view taken along line 9—9 of FIG. 7.

FIG. 10 shows a view taken along line 10—10 of FIG.

FIG. 11 shows a view taken along line 11—11 of FIG. 10.

DESCRIPTION OF THE PREFERRED EMBODIMENTS

Figure 3:
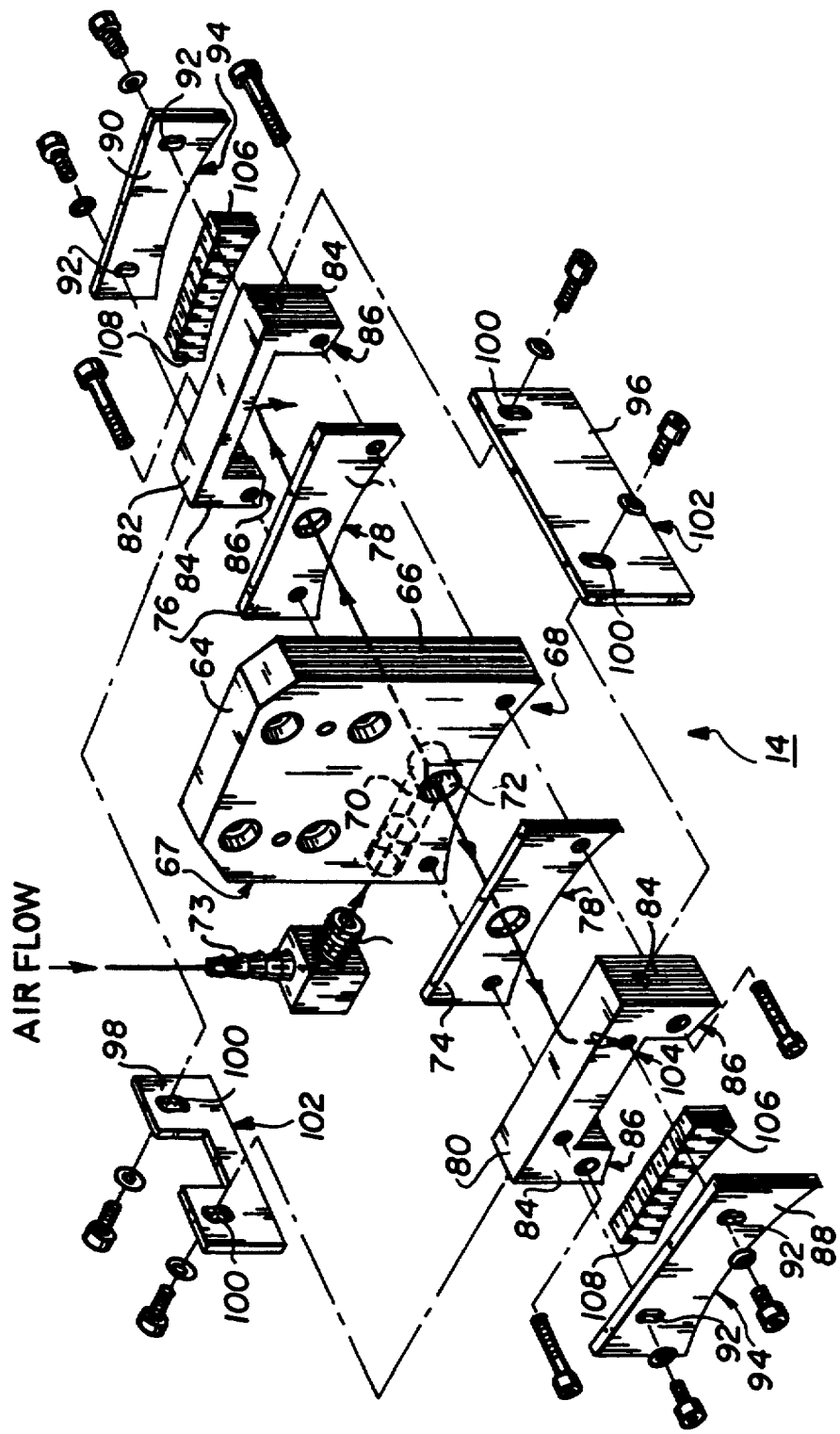
FIG. 3 shows an exploded perspective view of the apparatus of the invention.
Figure 4:
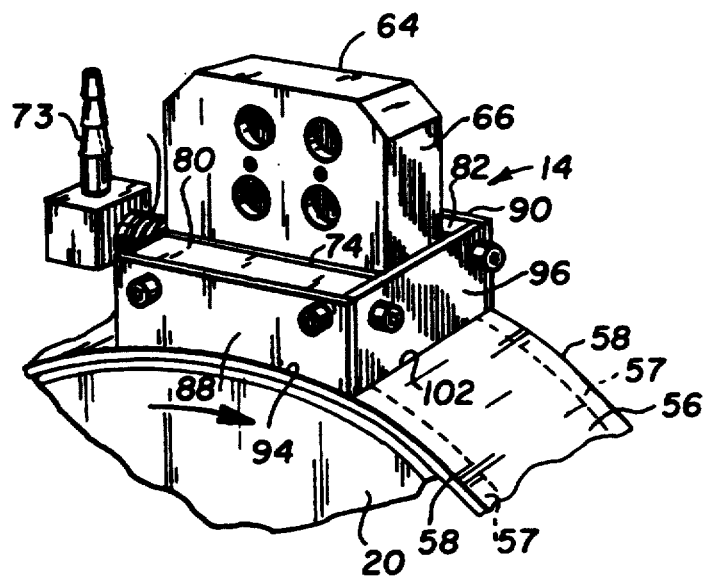
FIG. 4 shows a perspective view of the apparatus of the invention as installed adjacent an anhysteretic recording drum.

The following is a detailed description of the preferred embodiments of the invention, reference being made to the drawings in which the same reference numerals identify the same elements of structure in each of the several Figures.

The apparatus of FIGS. 1 and 2 is mounted on a rigid, typically vertical face plate 10. A rigid support arm 12 is attached to face plate 10 and supports at its outer end an apparatus 14 for pneumatically clamping and magnetically biasing recording media in accordance with the invention. A port 16 extends through face plate 10 to provide passage for a drive shaft 18 which rotates a vacuum drum 20. Alternatively, drum 20 may be an idler drum rather than a driven one. On the front side of face plate 10, a cylindrical housing 22 is mounted by means of a spacer plate 24. Within housing 22, a cylindrical bearing housing 26 is mounted. A central bore 28 in bearing housing 26 supports a pair of bearings 30, 32 for shaft 18. Surrounding the front end of bearing housing 26 is a vacuum stator ring 34 which comprises an approximately 180° exhaust plenum 36, shown in phantom in FIG. 1. A passage 38 extends from exhaust plenum 36 through a flange on bearing housing 26 and communicates with a connection fitting 40 for attachment to a source of subatmospheric pressure such as a vacuum pump, not illustrated. At the front end of shaft 18, a stainless steel hub 42 is mounted by suitable fasteners. Hub 42 is fitted into a bore within a vacuum drum rotor 44. The outer circular cylindrical surface 46 of rotor 44 preferably is machined precisely to minimize runout. Surface 46 may be coated with a master magnetic medium such as an alloy of 80/20 cobalt-platinum or may be wrapped with a master medium tape, as will be discussed subsequently. Surface 44 also could be contoured concavely to provide an increase in the normal force typically generated by tension in webs wrapped on the drum and the vacuum applied through the surface of the drum. Such a contour would modify the tension profile in the web so that improved intimate contact would be established along bands at the edges of the web where information transfer is to occur.

As shown in FIGS. 1, 2 and 9, around the circumference of rotor 44 are provided a plurality of axial bores 48 which are radially positioned to communicate with exhaust plenum 36 as drum 20 rotates, the opposite ends of bores 48 being plugged. A layer 50 of a high lubricity material such as Teflon or Rulon may be applied to the surface of stator ring 34 facing rotor 44, to minimize leakage. Each axial bore 48 communicates with a plurality of radial bores 52 which extend outward though surface 46. Incised into surface 46 in the familiar manner for vacuum drums is an array of axial and circumferential grooves, not illustrated, which serve to apply vacuum to the surface of a web wrapped about the drum. The quality of the vacuum achieved beneath such a web can vary as a function of applied tension, anticlastic effect, curl induced in the web by relative humidity, edge burrs and the like. Preferably, a vacuum in the range of about 15 to 25 inches (381 to 635 mm) of mercury is applied at connection fitting 40 to ensure removal of entrained air and the necessary intimate contact.

In operation, a master magnetic medium in the form of an elongated prerecorded magnetic tape or web 54 is wrapped onto drum 20 and held to the drum by vacuum applied via exhaust plenum 36. The magnetic coating of tape 54 is on the radially outward surface of the tape. Tape 54 may be any conventional magnetic recording medium having a coercivity about two to three times higher than that of the slave magnetic medium. A suitable master magnetic recording medium for use with photographic film including a slave magnetic medium is disclosed in commonly assigned U.S. Ser. No. 811,386 filed 20 Dec. 1991 and now allowed. A slave magnetic medium in the form of an elongated web 56 of photographic film is wrapped over web 54 as shown in FIG. 1; so that, the two contact rather intimately. Thus, drum 20 serves as a support member for webs 54, 56 where they are in intimate contact. Similarly, when drum 20 is coated with a master magnetic recording medium, the drum serves as a support member for the coated medium and web 56. The edges 58 of the film are parallel and the film has a longitudinal centerline. The magnetic coating of web 56 is on the radially inward surface of the film. Web 56 is a photographic film including a magnetic medium of the type shown in commonly assigned U.S. Pat. Nos. 3,782,947 and 4,302,523; in Research Disclosures Item 34390 of November 1992; and in commonly assigned, published International Patent Application No. WO 91/11750.

Referring simultaneously to FIGS. 1 to 10, the apparatus 14 of our invention is supported on arm 12 by an adjusting micrometer 60 having an adjusting screw 62 whose axis is perpendicular to the axis of shaft 18 of drum 20. Preferably, apparatus 14 is symmetrically disposed about the axis of screw 62; however, this is not critical. The movable portion of micrometer 60 is attached to a central mounting plate 64 of apparatus 14, as seen in FIGS. 1 to 3. Mounting plate 64 comprises a flat front surface 66, a flat back surface 67, parallel flat side surfaces extending therebetween, and a circular cylindrical undersurface 68. In assembled apparatus 14, undersurface 68 forms a portion of a pneumatic engagement surface which is oriented toward drum 20 and closely faces web 56 as the two webs move past on drum 20. The radius of curvature of surface 68 is larger than that of drum 20 by an amount sufficient to allow movement of webs 54, 56 beneath the apparatus, a radial clearance between the pneumatic engagement surface and drum 20 in the range of 0.004 to 0.012 inch (0.102 to 0.305 mm) being preferred. Mounting plate 64 also comprises an inlet passage 70 and a transverse passage 72 which deliver high pressure air to the interior of apparatus 14, via a high pressure air fitting 73. Flow rates in the range of 5 scfm (0.142 m³/m) at 25 psi (172.4 kPa) to 7 scfm (0.198 m³/m) at 50 psi (344.8 kPa) have been found effective to produce the desired intimate contact.

On each side of mounting plate 64 optionally may be positioned one of a pair of shim plates 74, 76 which may be used to adjust the overall width of apparatus 14. Each shim plate comprises a transverse passage for communicating with passage 72 and a circular cylindrical undersurface 78. In the assembled apparatus, undersurface 78 forms an extension of undersurface 68 and the pneumatic engagement surface. Outboard of each of shim plates 74, 76 is positioned one of a pair of mirror image, U-shaped housing members 80, 82. Suitable fasteners secure shim plates 74, 76 and housing members 80, 82 to central mounting plate 64. Each housing member comprises a pair of downwardly extending legs 84, each leg having a circular cylindrical undersurface 86 which in the assembled apparatus forms a further extension of undersurface 68 and the pneumatic engagement surface.

Figure 6:
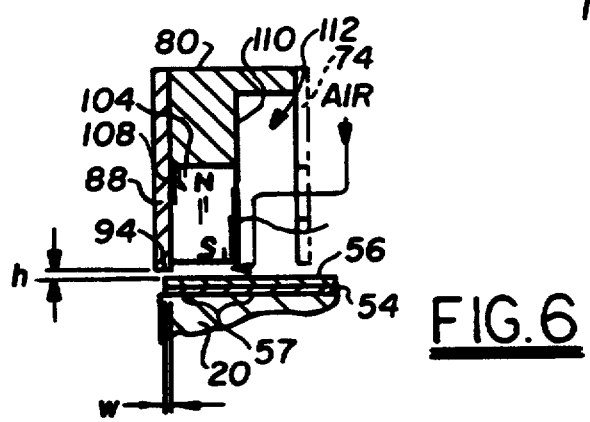
FIG. 6 shows a sectional view taken along line 6—6 of FIG. 5, along with fragments of the recording drum and magnetic media.

One of a pair of side plates 88, 90 is mounted to the outboard side of each housing member 80, 82 by means of fasteners which extend through vertical oblong holes 92. As shown in FIG. 6, each side plate 88, 90 preferably is positioned so that its circular cylindrical undersurface 94 overlaps by an axial distance w the edge of web 56. Preferably, distance w is as small as can be achieved, for example, by precise machining of shim plates 74, 76. Oblong holes 92 permit undersurface 94 preferably to be positioned a radial distance h from the outwardly facing surface of web 56. Preferably, distance h is in the range of 0.002 to 0.015 inch (0.051 to 0.038 mm), thereby to permit adjustment of the flow area for high pressure air leaving the interior of apparatus 14.

One of a pair of front and back plates 96, 98 is mounted to the front and back surfaces, respectively, of mounting plate 64 and housing members 80, 82 by means of fasteners which extend through vertical oblong holes 100. As shown in FIGS. 3, 7 and 8, oblong holes 100 permit a straight, angled undersurface 102 on each of the front and back plates preferably to be positioned a radial distance r from the surface of web 56. Preferably, distance r is in the range of 0.002 to 0.015 inch (0.051 to 0.38 mm), thereby also to permit adjustment of the flow area for high pressure air leaving the interior of apparatus 14. Preferably, distance r is smaller than distance h; so that, more air will flow below under surface 94 than undersurface 102, thus increasing the intimacy of contact along bands 57 along each edge 58 of film 56. See FIGS. 4 and 6 for schematic illustrations of the locations of bands 57.

Figure 5:
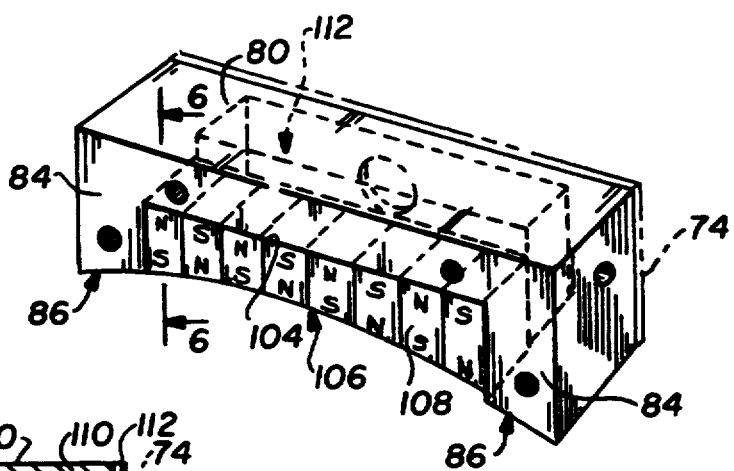
FIG. 5 shows a perspective view of a housing member comprised in the apparatus of the invention, illustrating the installation of the array of alternatingly polarized permanent magnets.

Each of housing members 80, 82 encloses an array of biasing magnets and a pneumatic plenum. For the first of these purposes, each housing member comprises an outboard, essentially rectangular recess 104 for receiving an array 106 of alternatingly polarized permanent magnets 108 situated in side by side relationship, each magnet 108 having a pole face with a width, measured transverse to film 56, which width extends substantially across band 57. In one actual embodiment, the pole face width was 0.25 inch (6.35 mm) and band 57 had a width of 0.21 inch (5.3 mm). Each pole face is oriented toward drum 20 and faces a band 57 near the edge of a zone of intimate contact between master magnetic recording medium 54 and the slave magnetic recording medium of film 56. As those skilled in the art will appreciate, it is within this zone that the anhysteretic transfer will occur from medium 54 to film 56. In the illustrated embodiment of apparatus 14, this zone of intimate contact may be considered to be bounded by side plates 88, 90 and front and back plates 96,98. As illustrated, each array 106 is supported within one of recesses 104, using epoxy cement, for example. Each array is elongated in a direction parallel to edge 58 of film 56 and extends substantially along the length of the zone of intimate contact just discussed. As discussed in U.S. Pat. No. 5,179,475 but not illustrated in the present FIGS. 5, 10 and 12, the first and last magnets in the array may be half the circumferential thickness of the others, to suppress stray magnetic fields. As illustrated in FIGS. 5, 7 and 10, the radial clearance between each array 106 and the associated band 57 is smallest where the film first enters the zone of intimate contact and gradually increases to a maximum where the film leaves the zone, thereby providing the necessary decaying magnetic field. The necessary decaying magnetic field also may be achieved with an array 106 having a straight undersurface as shown schematically in FIG. 12, rather than a curved one as shown in FIGS. 3, 5 and 10. In such a case, the straight undersurface would be positioned so that its radial clearance increases from the beginning to the end of the zone of intimate contact, thereby providing the decaying magnetic field.

Figure 12:
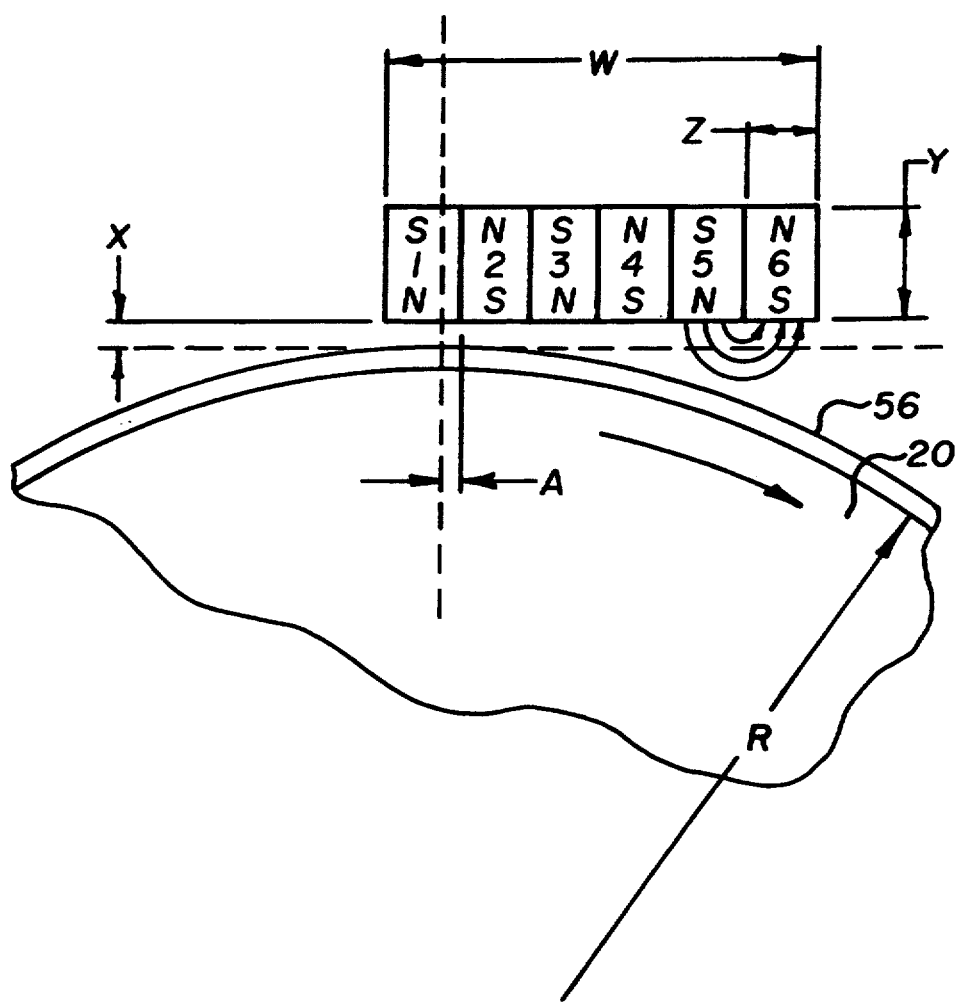
FIG. 12 shows a fragmentary view of a recording drum and magnetic array.

Referring to FIG. 12, one actual embodiment of the invention used a vacuum drum having a radius R of 1.75 inch (44.5 mm); and an array 106 having a length W approximately 0.9 inch (22.9 mm) long measured circumferentially relative to the drum, a height Y approximately 0.2 inch (5.08 mm) high measured radially relative to the drum and a pole face width approximately 0.3 inch (7.62 mm) wide measured axially relative to the drum. Each magnet had a length Z approximately 0.15 inch (0.38 cm) long measured circumferentially relative to the drum. The minimum radial clearance X to film 56 was about 0.015 inch (0.381 mm) and the maximum radial clearance was about 0.15 inch (3.81 mm), for about a 2 db knockdown of the master medium. With the array essentially horizontal as illustrated, the downstream edge of the first magnet was offset a distance A approximately 0.038 to 0.05 inch (0.965 to 1.27 mm) long measured circumferentially relative to the drum, from a perpendicular to the axis of the drum. The magnets were conventional, commercially available Neodymium-Iron-Boron particles in a plastic matrix. Those skilled in the art will appreciate that the pole strengths of the magnets for good transfer will depend on the magnetic properties of the master and slave media. Good information transfer was achieved to photographic film including a slave magnetic medium, with only six flux reversals. Furthermore, the need for precise positioning of the array relative to film 56 was reduced considerably compared to arrays made from magnets of the types described in commonly assigned U.S. Pat. No. 5,179,475. Alternatively, a constant radial clearance could be used, provided that magnets 108 were chosen to decrease in pole strength along the length of the zone of intimate contact.

For the second of these purposes, each housing member further comprises a larger, inboard, rectangular recess 110 which opens toward passage 72 and, together with mounting plate 64, defines a pneumatic plenum 112 within the assembled housing, the plenum being open through the pneumatic engagement surface previously described to face film 56. In the illustrated embodiment, two plenums 112 are provided, one on each side of mounting plate 64. As a result of this arrangement, air flowing through passage 72 flows through plenums 112 and presses against the surface of film 56 facing into plenums 112, thereby helping to express air from between web 54 and film 56. More importantly, since anhysteretic recording is desired within bands 57, the air passes between the pole faces of magnets 108 and bands 57 along the edge of film 56 and within the zone of intimate contact. The pressure of the air moving through the gap between the pole faces and the film substantially overcomes anticlastic curling of the film and clamps the bands 57 into intimate contact with the master recording medium, thereby enabling the decaying, alternating magnetic fields from array 106 to cause the desired anhysteretic transfer of information from web 54 to bands 57 along the edges of film 56. It is within the scope of our invention to provide for clamping one or both edges of film 56. Though mounting plate 64 preferably extends close to film 56 to separate the plenums 112, those skilled in the art will appreciate that a single plenum 112 may be provided by raising undersurface 68 away from the film without departing from the scope of our invention.

The apparatus of our invention is effective to clamp a photographic film including a magnetic recording medium into intimate contact with a master recording medium and to apply an alternating magnetic bias field so as to ensure good anhysteretic transfer of information from the master medium to bands along the edges of the film.

While our invention has been shown and described with reference to particular embodiments thereof, those skilled in the art will understand that other variations in form and detail may be made without departing from the scope and spirit of our invention.

Having described our invention in sufficient detail to enable those skilled in the art to make and use it, we claim as new and desire to secure Letters Patent for:

1. Apparatus for pneumatically clamping a portion of at least one edge of an elongated web of photographic film, the film including a slave magnetic recording medium and having a centerline, into intimate contact with a master magnetic recording medium carried on a support member; and for magnetically biasing the contacting media to cause anhysteretic transfer of information from the master medium to a band along the edge of the film as the band moves past the apparatus while the band is in intimate contact with the master medium, the apparatus comprising:

a housing having a pneumatic engagement surface;
   means for mounting the housing so that the engagement surface is oriented toward the support member and closely faces a zone of the intimate contact between the film and the master recording medium;
   a pneumatic plenum within the housing, the plenum being opened through the engagement surface to face one side of the film between the centerline and the band along the edge of the film, the plenum further being elongated in a direction parallel to the edge of the film;
   means for directing a flow of gas into the pneumatic plenum; and
   an array of a plurality of alternatingly polarized permanent magnets situated in side by side relationship, each magnet having a pole face with a width measured transverse to the film and extended substantially across the band along the edge of the film, each pole face being oriented toward the support member and facing the band in the zone of intimate contact, the array being supported by the housing and the magnets being side by side in a direction essentially parallel to the edge of the film, whereby gas flowing from the plenum will pass transverse to the film between the pole faces and the band along the edge of the film in the zone of intimate contact to clamp the band toward the support member and into intimate contact with the master medium, thereby enabling alternating magnetic fields from the array to cause the anhysteretic transfer of information from the master medium to the band along the edge of the film.

2. Apparatus according to claim 1, wherein the housing comprises a side surface; the array is positioned between the plenum and the side surface; and the side surface terminates at an edge which extends beyond the engagement surface and which faces the band along the edge of the film.

3. Apparatus according to claim 2, wherein the side surface is comprised in a side plate including the edge facing the band, further comprising means for permitting movement of the side plate relative to the housing toward or away from the band along the edge of the film, thereby to control the flow area for the gas.

4. Apparatus according to claim 1, wherein the housing comprises front and back plates extended transverse to the edge of the film, the front and back plates each having an edge extending beyond the engagement surface and facing the film, further comprising means for permitting movement of the front and back plates relative to the housing toward or away from the film, thereby to control the flow area for the gas.

5. Apparatus according to claim 1, further comprising means, connected between the means for mounting and the housing, for moving the housing toward or away from the zone of intimate contact to adjust a clearance between the pole faces and the band in the zone of intimate contact.

6. Apparatus according to claim 5, wherein the means for moving the housing is centered on the array.

7. Apparatus for pneumatically clamping a portion of opposite edges of an elongated web of photographic film, the film including a slave magnetic recording medium and having a centerline, into intimate contact with a master magnetic recording medium carried on a support member; and for magnetically biasing the contacting media to cause anhysteretic transfer of information from the master medium to bands along the edges of the film as the bands moves past the apparatus while the bands are in intimate contact with the master medium, the apparatus comprising:

a housing having a pneumatic engagement surface;
   means for mounting the housing so that the engagement surface is oriented toward the support member and closely faces a zone of the intimate contact between the film and the master recording medium;
   a first pneumatic plenum within the housing, the first plenum being opened through the engagement surface to face one side of the film between the centerline and the band along one edge of the film, the first plenum further being elongated in a direction parallel to the one edge of the film;
   a second pneumatic plenum within the housing, the second plenum being opened through the engagement surface to face the one side of the film between the centerline and a further band along an opposite edge of the film, the second plenum also being elongated in a direction parallel to the opposite edge of the film;

means for directing a flow of gas into the first and second pneumatic plenums;

a first array of a plurality of alternatingly polarized permanent magnets situated in side by side relationship, each magnet having a pole face with a width measured transverse to the film and extended substantially across the band along the one edge of the film, each pole face being oriented toward the support member and facing the band in the zone of intimate contact, the first array being supported by the housing and the magnets being side by side in a direction essentially parallel to the one edge of the film; and a second array of a further plurality of alternatingly polarized permanent magnets situated in side by side relationship, each magnet of the second array having a pole face with a further width measured transverse to the film and extended substantially across the further band, the pole face of each magnet of the second array being oriented toward the support member and facing the further band along the opposite edge of the film in the zone of intimate contact, the second array being supported by the housing and the magnets of the second array being side by side in a direction essentially parallel to the opposite edge of the film, whereby gas flowing from the first and second plenums will pass transverse to the film between the pole faces and the bands along the edges of the film in the zone of intimate contact to clamp the bands toward the support member and into intimate contact with the master medium, thereby enabling alternating magnetic fields from the arrays to cause the anhysteretic transfer of information from the master medium to the bands along the edges of the film.

8. Apparatus according to claim 7, wherein the housing comprises side surfaces; the arrays are positioned respectively between the plenums and the side surfaces; and the side surfaces each terminate at an edge which extends beyond the engagement surface and which faces the respective band along the respective edge of the film.

9. Apparatus according to claim 8, wherein each side surface is comprised in a side plate including the edge facing the band, further comprising means for permitting movement of the side plate relative to the housing toward or away from the band along the edge of the film, thereby to control the flow area for the gas.

10. Apparatus according to claim 7, wherein the housing comprises front and back plates extended transverse to the edges of the film, the front and back plates each having an edge extending beyond the engagement surface and facing the film, further comprising means for permitting movement of the front and back plates relative to the housing toward or away from the film, thereby to control the flow area for the gas.

11. Apparatus according to claim 7, further comprising means, connected between the means for mounting and the housing, for moving the housing toward or away from the zone of intimate contact to adjust a clearance between the pole faces and the band in the zone of intimate contact.

12. Apparatus according to claim 11, wherein the means for moving the housing is centered on the arrays.

* * * * *